US011416550B2

(12) United States Patent
Lipman

(10) Patent No.: US 11,416,550 B2
(45) Date of Patent: *Aug. 16, 2022

(54) METHODS, SYSTEMS, AND MEDIA FOR RESOLVING DATABASE QUERIES USING ALGEBRAIC EXPRESSIONS USING MATRIX-MATRIX MULTIPLICATION

(71) Applicant: Redis Labs Ltd., Hod Hasharon (IL)

(72) Inventor: Roi Lipman, Rehovot (IL)

(73) Assignee: Redis, LTD, Tel-Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/845,949

(22) Filed: Apr. 10, 2020

(65) Prior Publication Data
US 2020/0410004 A1 Dec. 31, 2020

Related U.S. Application Data

(63) Continuation of application No. 16/454,993, filed on Jun. 27, 2019, now Pat. No. 10,621,235.

(Continued)

(51) Int. Cl.
*G06F 16/901* (2019.01)
*G06F 16/9032* (2019.01)
(Continued)

(52) U.S. Cl.
CPC ........ *G06F 16/9024* (2019.01); *G06F 16/904* (2019.01); *G06F 16/90328* (2019.01); *G06F 17/16* (2013.01)

(58) Field of Classification Search
CPC ............... G06F 16/9024; G06F 16/904; G06F 16/90328; G06F 17/16

(Continued)

(56) References Cited

U.S. PATENT DOCUMENTS 5,701,456 A * 12/1997 Jacopi ................. G06F 16/2428
7,082,433 B2 * 7/2006 Anonsen ............... G06F 16/284
(Continued)

FOREIGN PATENT DOCUMENTS

CN 108874954 11/2018

OTHER PUBLICATIONS

Yuster et al., "Answering Distance Queries in Directed Graphs using Fast Matrix Multiplication", 2005, IEEE, 8 pages printed (Year: 2005).*

(Continued)

*Primary Examiner* — Tony Mahmoudi
*Assistant Examiner* — Michael Le
(74) *Attorney, Agent, or Firm* — Byrne Poh LLP

(57) ABSTRACT

Mechanisms for resolving a database query are provided. In some instances, these mechanisms include identifying a connected component in a query graph corresponding to the database query. In some instances, these mechanisms further include determining a longest path length for the connected component. In some instances, these mechanisms further include selecting a path having the longest path length. In some instances, these mechanisms still further include building an algebraic expression for the path. In some instances, these mechanisms still further include solving the algebraic expression using matrix-matrix multiplication to provide a solution. And, in some instances, these mechanisms still further include responding to the query based on the solution.

24 Claims, 8 Drawing Sheets

Related U.S. Application Data

(60) Provisional application No. 62/854,316, filed on May 29, 2019, provisional application No. 62/847,211, filed on May 13, 2019.

(51) Int. Cl.
*G06F 17/16* (2006.01)
*G06F 16/904* (2019.01)

(58) Field of Classification Search
USPC .......................................................... 707/798
See application file for complete search history.

(56) References Cited

U.S. PATENT DOCUMENTS

| | | | |
|---|---|---|---|
| 7,991,769 B2* | 8/2011 | Fontoura | G06F 16/3325 707/719 |
| 8,515,975 B1* | 8/2013 | Federici | G06F 16/248 707/750 |
| 8,825,651 B1 | 9/2014 | Broekhuijsen et al. | |
| 9,116,948 B2* | 8/2015 | Cheng | G06F 16/24575 |
| 9,330,138 B1* | 5/2016 | Shankar | G06F 16/24575 |
| 2003/0225743 A1* | 12/2003 | Inokuchi | G06F 16/9024 |
| 2004/0230584 A1* | 11/2004 | Nouri | G06F 16/289 |
| 2006/0136098 A1* | 6/2006 | Chitrapura | G06F 16/951 700/262 |
| 2007/0208693 A1* | 9/2007 | Chang | G06F 16/9024 |
| 2007/0214111 A1* | 9/2007 | Jin | G06F 16/258 |
| 2008/0033914 A1* | 2/2008 | Cherniack | G06F 16/283 |
| 2008/0147627 A1* | 6/2008 | Natkovich | G06F 16/2454 707/E17.05 |
| 2008/0218519 A1* | 9/2008 | Coury | G06T 11/206 345/440 |
| 2011/0004581 A1* | 1/2011 | Schmidt | G06F 17/11 707/769 |
| 2011/0307511 A1* | 12/2011 | Asai | G06F 16/832 707/769 |
| 2013/0080476 A1* | 3/2013 | Tokai | G06F 16/3331 707/E17.011 |
| 2013/0124488 A1 | 5/2013 | Kang et al. | |
| 2013/0173653 A1* | 7/2013 | Beckman | G06Q 10/04 707/769 |
| 2013/0232171 A1 | 9/2013 | Cheng et al. | |
| 2014/0172914 A1* | 6/2014 | Elnikety | G06F 16/9024 707/774 |
| 2015/0032767 A1* | 1/2015 | Gao | G06F 16/951 707/765 |
| 2015/0033106 A1* | 1/2015 | Stetson | G06F 16/9024 715/215 |
| 2016/0306897 A1* | 10/2016 | Huang | G06F 16/9024 |
| 2016/0328443 A1* | 11/2016 | Abraham | G06F 16/9024 |
| 2016/0357799 A1* | 12/2016 | Choi | H04L 9/3066 |
| 2017/0060958 A1* | 3/2017 | Van Rest | G06F 16/9024 |
| 2017/0213089 A1* | 7/2017 | Chen | G06V 20/52 |
| 2018/0349509 A1* | 12/2018 | Abou Mahmoud | G06V 30/422 |
| 2019/0171669 A1* | 6/2019 | Patankar | G06F 16/9024 |

OTHER PUBLICATIONS

Jamour et al., "A Demonstration of MAGiQ: Matrix Algebra Approach for Solving RDF Graph Queries", VLDB Endowment, vol. 11, No. 12, 2018, pp. 1978-1981, 4 pages printed (Year: 2018).*

Gubichev, Andrey "Query Processing and Optimization in Graph Databases", PhD dissertation, Technische Universitat Munchen, 178 pages printed. (Year: 2015).*

Anyanwu et al., "SPARQ2L: Towards Support for Subgraph Extraction Queries in RDF Databases", IW3C2, May 8-12, 2007, pp. 797-806, 10 pages printed (Year: 2007).*

Gubichev, A., "Query Processing and Optimization in Graph Databases", PhD Thesis, Technische Universitat Munchen, Jul. 22, 2015, pp. 1-178.

International Search Report and Written Opinion dated May 26, 2020 in PCT Application No. PCT/IL2020/050413, pp. 1-15.

Jamour, F. et al., "A Demonstration of MAGiQ: Matrix Algebra Approach for Solving RDF Graph Queries", in proceedings of the VLDB Endowment, vol. 11, No. 12, Sep. 10, 2018, pp. 1978-1981.

Notice of Allowance dated Feb. 26, 2020 in U.S. Appl. No. 16/454,993, pp. 2-5.

Office Action dated Nov. 5, 2019 in U.S. Appl. No. 16/454,993, pp. 2-11.

Ordonez, C. et al., "Time Complexity and Parallel Speedup of Relational Queries to Solve Graph Problems", in International Conference on Database and Expert Systems Applications, Springer, Aug. 9, 2018, pp. 339-349.

Paradies, M., "Graph Processing in Main-Memory Column Stores", PhD Thesis, Saechsische Landesbibliothek-Staats-und Universitaetsbibliothek, Dresden, Apr. 25, 2017, pp. 1-196.

* cited by examiner

METHODS, SYSTEMS, AND MEDIA FOR RESOLVING DATABASE QUERIES USING ALGEBRAIC EXPRESSIONS USING MATRIX-MATRIX MULTIPLICATION

CROSS-REFERENCE TO RELATED APPLICATION

This application is a continuation of U.S. patent application Ser. No. 16/454,993, filed Jun. 27, 2019, now U.S. Pat. No. 10,621,235, issued Apr. 14, 2020, which claims the benefit of U.S. Provisional Patent Application No. 62/847,211, filed May 13, 2019, and of U.S. Provisional Patent Application No. 62/854,316, filed May 29, 2019, each of which is hereby incorporated by reference herein in its entirety.

TECHNICAL FIELD

The disclosed subject matter relates to methods, systems, and media for resolving graph database queries.

BACKGROUND

Graphs are mathematical structures that can model and indicate relationships between different objects or entities. For example, a graph can include different nodes that are connected to each other by edges. Each node can represent an object or entity, while each edge can represent the relationship between the objects and/or entities it connects. An edge can be undirected (e.g., there is no directional relationship represented by the edge), or an edge can be directional (e.g., there is a direction associated with the connection between two nodes) and therefore have a source node and a destination node.

Graphs can be stored in a graph database. A property graph database can be optimized for storage and retrieval of schema-less connected data. A data point can be represented as a node within a graph. A node can be associated with multiple labels in addition to an optional attribute-set describing the node. For example, a node of type "Person" can have attributes {"Surname", "Given name", and "Age"}.

Edges can be associated with a "relationship-type" specifying its type. For example, an edge can have a relationship-type "Visit" that indicates that a person identified by a source node visited a country identified by a destination node. In addition, an edge can have an attribute-set. For example, an edge with relationship-type "Visit" can have attributes {"Purpose", "Length"}.

Edges can be stored in a graph database as a matrix. For example, a directional edge can connect a node i to a node j. In such case, node i is the source node while node j is the destination node. This connection can be noted by setting the graph matrix at position [i,j] to 1. Matrix rows can be used to represent source nodes while matrix columns represent destination nodes, or vice versa.

Below is an example of a matrix representing a graph with three nodes (node 0, node 1, and node 2):

$$G = \begin{bmatrix} . & . & 1 \\ . & . & 1 \\ . & 1 & . \end{bmatrix}$$

In this example, node 0 is connected to node 2, node 1 is connected to node 2, and node 2 is connected to node 1. This matrix can be referred to as an adjacency matrix. This is, it is a binary matrix, representing all connections within the graph regardless of the connection type.

Some graph matrices can be label matrices. A label matrix can be a diagonal binary matrix for a given label in which nodes having the given label are identified. For example, in a label matrix representing the label "L", a node i labeled as "L" can be represented by a 1 at position [i,i]. Below is an example of a label matrix:

$$L = \begin{bmatrix} 1 & . & . \\ . & . & . \\ . & . & 1 \end{bmatrix}$$

As shown, this label matrix indicates that node 0 and node 2 have the label "L".

Some graph matrices can be relation matrices. A relation matrix can be a binary matrix for a given relation-type in which edges having the given relation-type are identified. For example, in a relation matrix representing the relation-type "R", an edge of relation-type "R" that connects node i to node j can be represented by a 1 at position [i,j]. Below is an example of a relation matrix:

$$R = \begin{bmatrix} . & 1 & . \\ . & . & . \\ . & . & . \end{bmatrix}$$

As shown, this relation matrix indicates that node 0 is connected to node 1 via an edge of relation-type R.

Data regarding a graph can be retrieved from a graph database using a query language. For example, a query language such as OpenCypher can be used to retrieve data from a graph database. More particularly, a query can have the following format:

MATCH (a)-[:X]→(b)-[ ]→(c)←[:Z]-(d) RETURN c

In this format: "( )" represents a node; and "[ ]" represents an edge.

Both nodes and edges may be assigned an alias and a label. A node can have the following format: (Alias: Label). An edge can have the following format: [Alias: Label]. A path can be formed by chaining nodes with edges. For example node A being connected to node B using an edge of type R can be represented as: (A)-[:R]→(B).

A connection can be specified using either a left-to-right arrow or a right-to-left arrow. The arrow can be omitted when the edge direction does not matter. The following are examples:

(A)-[:R]→(B)—A is connected to B.
(A)←[:R]-(B)—B is connected to A.
(A)-[:R]-(B)—A and B are connected.

As a more particular example, if one wanted to find, for every person in a graph, which countries their friends visited, a query such as the following may be used:

MATCH (p:Person)-[:friend]→(f:Person)-[:visit]→(c:Country)
RETURN p, c

However, such a query can be time-sensitive and resource-intensive. For example, such a query may require a linear traversal through many different edges of the graph, which can make returning a response to the query time-intensive.

Accordingly, it is desirable to provide new methods, systems, and media for resolving graph database queries.

SUMMARY

In accordance with some embodiments, methods, systems, and media for resolving database queries are provided. In some embodiments, methods for resolving a database query are provided, the methods comprising: identifying a connected component in a query graph corresponding to the database query; determining a longest path length for the connected component; selecting a path having the longest path length; building an algebraic expression for the path; solving the algebraic expression using matrix-matrix multiplication to provide a solution; and responding to the query based on the solution.

In some embodiments, systems for resolving a database query are provided, the systems comprising: a memory; at least one hardware processor coupled to the memory and collectively configured to: identify a connected component in a query graph corresponding to the database query; determine a longest path length for the connected component; select a path having the longest path length; build an algebraic expression for the path; solve the algebraic expression using matrix-matrix multiplication to provide a solution; and respond to the query based on the solution.

In some embodiments, non-transitory computer-readable media containing computer-executable instructions that, when executed by a processor, cause the processor to perform a method for resolving a database query are provided, the method comprising: identifying a connected component in a query graph corresponding to the database query; determining a longest path length for the connected component; selecting a path having the longest path length; building an algebraic expression for the path; solving the algebraic expression using matrix-matrix multiplication to provide a solution; and responding to the query based on the solution.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
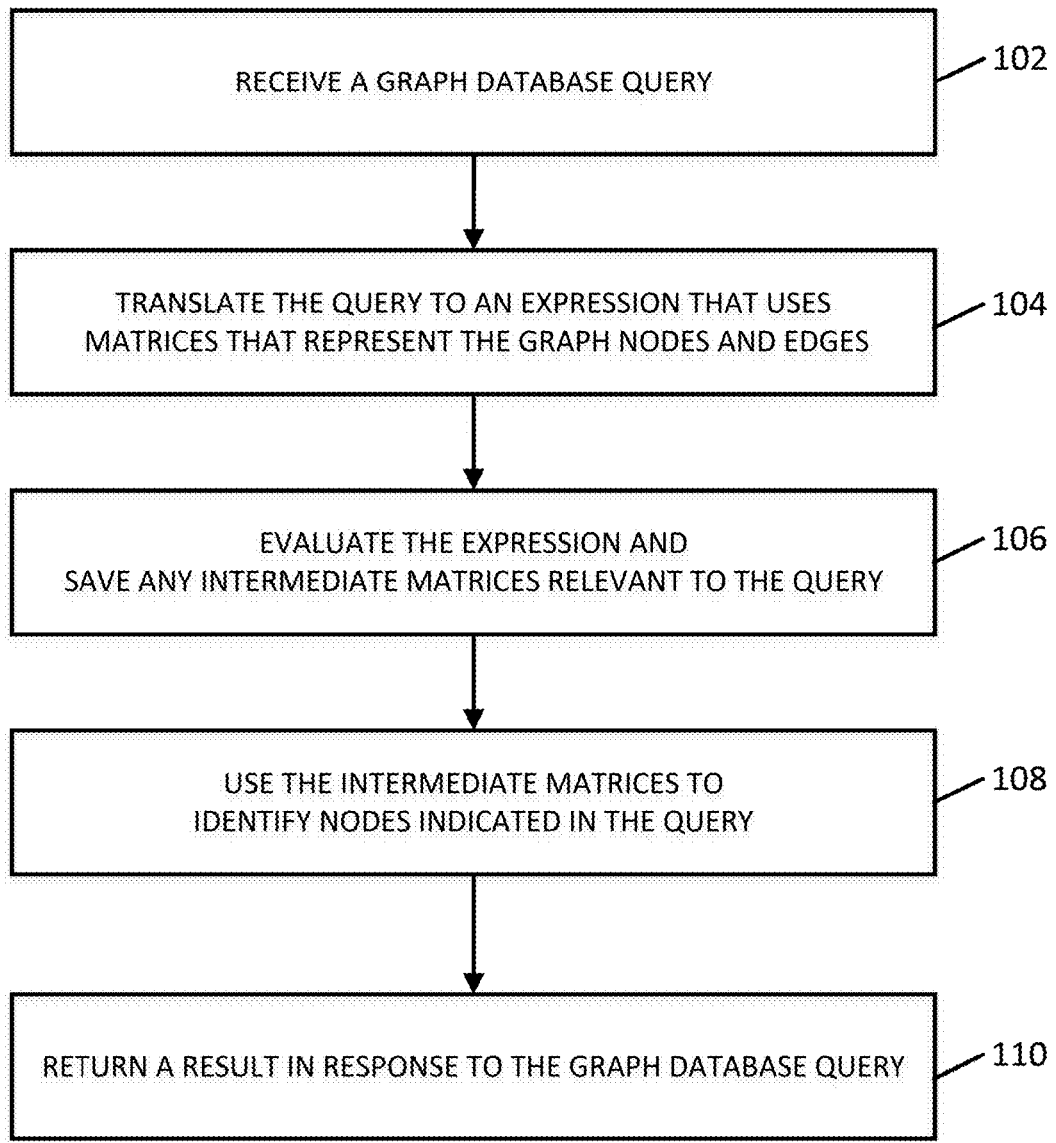
FIG. 1 shows an example of a process for resolving graph database queries in accordance with some embodiments of the disclosed subject matter.

In accordance with various embodiments, mechanisms (which can include methods, systems, and media) resolving graph database queries are provided.

In some embodiments, the mechanisms described herein can be used to quickly identify and return results corresponding to a query relating to a graph database. For example, in some embodiments, the mechanisms described herein can receive a query that indicates a traversal within a particular graph between any suitable number of nodes having any suitable number of edges between the nodes. In some embodiments, the mechanisms described herein can translate a received query to a series of matrix-matrix multiplications, where each matrix identifies relationships between two nodes, such as whether an edge corresponding to a particular type of relationship exists between two nodes.

For example, in an instance in which a graph indicates whether different people have visited different countries, the mechanisms described herein can represent the nodes and edges with a matrix R, in which rows of matrix R indicate different people, and columns of matrix R indicate countries, and each element of matrix R (that is, an element $R_{i,j}$) indicates whether person i has visited country j. In some embodiments, a query that represents multiple traversals across various nodes and edges can then be represented by a matrix-matrix multiplication, such as $M = R_1 * R_2 * \ldots R_j$, as described below in more detail in connection with FIG. 1.

In some embodiments, the mechanisms described herein can identify a set of results corresponding to a received query based on matrix-matrix multiplications.

As a more particular example, if one wanted to find, for every person in a graph, which countries their friends visited, a query such as the following may be used:

MATCH (p:Person)-[:friend]→(f:Person)-[:visit]→(c:Country)

RETURN p, c

In some embodiments, to answer this query, the following expression can be constructed and evaluated:

$$P * F * P * V * C,$$

where P is a label matrix which mark all Person nodes in the graph, F is a relation matrix describing each edge of type friend, V is a relation matrix describing each edge of type visit, C is the label matrix which marks all Country nodes in the graph.

In some embodiments, all matrices in a database can be required to be of the same dimensions (e.g., N by N square matrices).

In some embodiments, each matrix row and each matrix column can have an associated "domain." A matrix row domain can indicate what the matrix rows represent and a matrix column domain can indicate what the matrix columns represent (e.g., V's rows represent people while V's columns represent countries).

In some embodiments, when performing multiplication, it is important to make sure that the domains make sense and are aligned: the column domain of a left-hand-side operand should match the row domain of the right-hand-side operand. For example, consider the following equation:

$$A \begin{bmatrix} . & 1 & . \\ . & . & . \\ . & . & . \end{bmatrix} * B \begin{bmatrix} . & . & . \\ . & . & 1 \\ . & . & . \end{bmatrix} = c \begin{bmatrix} . & . & 1 \\ . & . & . \\ . & . & . \end{bmatrix}$$

C's row domain matches A's row domain, and C's column domain matches B's column domain.

In some embodiments, the left-most operand row domain is "sticky" and will not change for every intermediate multiplication. Rather, it will carry over all the way to the final result. On the other hand, in some embodiments, the column domain is set for every intermediate multiplication to the right operand's column domain.

Although it is sensible to assume that the friend relation would only connect Person nodes, this might not be the case. Therefore, in the expression "P*F*P*V*C" above, F is multiplied by P from both sides (i.e., "P*F*P"). Multiplying a matrix M on the left by a diagonal matrix D simply filters M's rows, keeping each Row i where D[i,i] is 1 and clearing each Row j where D[j,j] is 0. The same filtering is applied to M's columns when multiplying with M on the right by a diagonal matrix. Thus, multiplying F by P from both sides (i.e., "P*F*P") filters the result of P*F*P to only show people listed in P. Thus, for example, if P is subset (e.g., employees of a company in a city) of a larger group of people identified in P' (e.g., all people in the city), P*F*P would only show people who have fellow employees who are friends, whereas P*F*P' would show all friends in the city of the employees.

Because matrix-matrix multiplication is associative, the expression "P*F*P*V*C" can be split up as "(P*F*P)*(V*C)" as follows:

$$P * F * P = \begin{bmatrix} . & 1 & 1 \\ . & . & . \\ . & 1 & . \end{bmatrix}$$

$$V * C = \begin{bmatrix} . & . & . \\ 1 & . & . \\ . & 1 & 1 \end{bmatrix}$$

$$\text{RESULT} = (P*F*P)*(V*C) = \begin{bmatrix} 1 & 1 & 1 \\ . & . & . \\ 1 & . & . \end{bmatrix}$$

Looking at the top row (0) in the RESULT matrix, it can be seen that a person with ID 0 (row domain) has some friends (the matrix does not indicate who they are) who've visited countries (column domain) with IDs 0, 1 and 2. This example illustrates the fact that matrix-matrix multiplication losses information.

Suppose, in the example above, that the query also requested the database to return the friends list, such that the result-set comprised of triplets: (Person, Friend, Country). The following query might be used:

MATCH (p:Person)-[:friend]→(f:Person)-[:visit]→(c:Country)
RETURN p, f, c

In order to respond to this query, the original expression can be broken into two expressions and tied together:

P*F*P

V*C

To tie two expressions together, an intermediate diagonal matrix can be constructed in some embodiments. The diagonal matrix can indicate if nodes in the columns of the result matrix are reachable. For example, for the query directly above, a diagonal matrix f can be constructed. In this diagonal matrix, f[i,i] is equal to 1 if person i is indicated as being reachable in P*F*P. So, for example, consider the following matrix representing P*F*P:

$$P*F*P = \begin{bmatrix} . & 1 & 1 \\ . & . & . \\ . & 1 & . \end{bmatrix}$$

A person can be indicated in this matrix as being reachable if the column corresponding to that person has a 1 anywhere in it. That is, the diagonal of f is a logical OR of the values in the corresponding column of P*F*P as follows:

$$f = \begin{bmatrix} . & . & . \\ . & 1 & . \\ . & . & 1 \end{bmatrix}$$

f can then be attached as the left-most operand to the second expression, acting as a filter, as follows:

f*V*C

Upon evaluating this expression, it can be determined what countries in C were visited by the friends identified in f.

In some embodiments, intermediate matrices can occur because they are mentioned in final result-sets (e.g., RETURN clauses), in filter criteria (e.g., WHERE clauses), in graph modifications (e.g., CREATE, SET, UPDATE clauses), and/or any other suitable characteristic, feature, query, etc. of a database.

In some embodiments, the mechanisms can determine whether a results clause included in a query indicates nodes that are represented in a final matrix multiplication product M, or, alternatively, if nodes included in the results clause are indicated in intermediate matrix products, such as $R_1*R_2$. In some embodiments, the mechanisms described herein can traverse backwards through a series of matrix multiplications to identify nodes indicated in the results clause that satisfy criteria indicated in the query.

In some embodiments, the mechanisms described herein can be used to create a particular data structure useful for representation and analysis of graph databases. For example, in some embodiments, by representing a graph database using the data structure(s) described herein, the mechanisms described herein can allow queries, including complex queries involving multiple (e.g., ten, twenty, and/or any other suitable number) traversals within a graph to be quickly resolved. For example, in some embodiments, the mechanisms described herein can increase speed associated with returning a result for a graph database query by processing individual components of the data structure analysis in parallel, as described below in more detail in connection with 106 of FIG. 1. In some embodiments, the mechanisms described herein can therefore allow a graph database to operate more quickly and more efficiently, thereby reducing power consumption by a device storing and processing queries related to the graph database.

Turning to FIG. 1, an example 100 of a process for resolving graph database queries that can be used in accordance with some embodiments of the disclosed subject matter is shown. Note that, in some embodiments, blocks of process 100 can be performed on any suitable device. For example, in some embodiments, a graph database can be stored on a user device, such as a desktop computer or a laptop computer, and blocks of process 100 can be executed by the user device. As another example, in some embodiments, a graph database can be stored on a server, and blocks of process 100 can be executed by the server.

Process 100 can begin at 102 by receiving a query related to a graph database. Any suitable query can be received in any suitable manner and have any suitable content. An example of a query relating to a graph that indicates relationships between different people can be: "MATCH (p: Person)-[:friend]→(f:Person) RETURN p." In this example, the query can indicate that nodes labeled as "Person" are to be returned, and, additionally, that each returned Person node must be connected with an edge that indicates a "Friend" relationship to another person. Note that, in some embodiments, a received query can request any suitable number of returned nodes. Additionally, in some embodiments, a received query can specify any suitable number (e.g., one, two, five, ten, and/or any other suitable number) of connections or edges between nodes. For example, the query described in the above example describes a relationship between two Person nodes connected by one Friend edge. As another example, a query can describe a relationship between any suitable number of person nodes (e.g., two, three, five, and/or any other suitable number) connected by any suitable edges (e.g., friendship, colleagues, classmates, and/or any other suitable edges or types of connections). Examples of queries that include more nodes and more edges than the above example are given below.

Note that, in some embodiments, the clause "RETURN p" as included in the example query shown above can be referred to as a "result clause" and/or as a "return clause." For example, in some embodiments, "RETURN p" can be referred to as a "return clause" in particular database query languages.

At 104, process 100 can translate the query to an expression that can be evaluated. In some embodiments, the query can be translated to an expression that represents the query using any suitable number of matrices that each represent nodes and edges of a graph. In some embodiments, process 100 can translate the query to an expression that uses matrices that represent nodes and edges of a graph using any suitable technique or combination of techniques. For example, in some embodiments, the query can be translated to a matrix expression by using a matrix $R_j$ to represent a (node $N_i$)-[edge $R_j$]→(node $N_k$) triplet. In some such embodiments, each row of $R_j$ can represent a node $N_i$, and each column of $R_j$ can represent a node $N_k$. Continuing with the example query given above in connection with 102, the query can be translated to a matrix R that has rows corresponding to Person p and columns corresponding to Person f.

In some embodiments, a query that includes a representation of a traversal of two or more edges can be represented as a matrix multiplication, where each matrix in the expression corresponds to a triplet, as described above. For example, in an example where a query includes a traversal across multiple nodes in a graph, such as: "$(N_0)$-$[R_0]$→$(N_1)$-$[R_1]$→$(N_2)$ . . . -$[R_i]$→$(N_i)$," the traversal can be translated to a matrix multiplication: $R_0*R_1* \ldots *R_i$, where each R matrix represents the nodes related by corresponding edges. As a more particular example, matrix $R_0$ can have rows corresponding to nodes $N_0$ and columns corresponding to nodes $N_1$, where edges connecting nodes $N_0$ to nodes $N_1$ can relate to any suitable type of connection. Note that, in the example query shown above, where node $N_0$ is related to node $N_1$ via relationship edge $R_0$, matrix $R_0$ can indicate nodes $N_0$ that are connected to nodes $N_1$ via a particular type of relationship indicated by the relationship $R_0$ (e.g., friendship between two people, and/or any other suitable type of relationship). Alternatively, in an instance where a query is: "$(N_0)$-[ ]→$(N_1)$," that is, where no particular relationship is specified in the query, a matrix representing the relationship between nodes $N_0$ and $N_1$ can be relationship agnostic.

Additionally, note that, in general, as described herein, a matrix representing relationships and/or connections between nodes can indicate source nodes by rows of the matrix, and sink nodes or destination nodes by columns of the matrix. In some embodiments, this type of matrix notation can be referred to as row order. However, in some embodiments, a matrix representing relationships and/or connections between nodes can indicate source nodes by columns of the matrix and sink nodes or destination nodes by rows of the matrix, which can be referred to as column order. Note that, in some embodiments, the techniques described herein can be implemented regardless of whether a matrix is structured using row order or column order.

At 106, process 100 can evaluate the expression resulting from the translated query. In some embodiments, process 100 can evaluate the expression using any suitable technique(s). For example, in an instance where the expression includes a multiplication of matrices, such as $R_0*R_1* \ldots *R_i$, as described above, process 100 can calculate a result matrix M that is the product of $R_0*R_1* \ldots *R_i$. Note that, in some embodiments, a matrix multiplication can be performed in any suitable manner. For example, in some embodiments, because matrix multiplication is associative, different components of the multiplication can be computed individually. As a more particular example, given the matrix multiplication $R_0*R_1* \ldots *R_i$, $R_0*R_1$ can be calculated separately from $R_{i-1}*R_i$. Additionally or alternatively, in some embodiments, individual components can be calculated in parallel. In some embodiments, individual matrix multiplications can be computed using any suitable type of processor, such as a Graphics Processing Unit (GPU), and/or any other suitable type of processor to increase speed of calculations.

Note that, a matrix multiplication such as $M=R_0*R_1* \ldots *R_i$ can represent any suitable type of information. For example, in some embodiments, rows of M can represent nodes $N_0$ and columns of M can represent nodes $N_i$, where the $N_i$ entities can be nodes that can be reached from $N_0$ entities by traversing a graph using i hops or traversals within the graph. In some embodiments, for each intermediate matrix multiplication (e.g., $R_0*R_1$, $R_{i-1}*R_i$, and/or any other suitable intermediate multiplication), the resulting product can maintain a row domain of the first component, and, for every multiplication $R_x*Rx_{+1}$, a columns domain can change to the column domain represented by $Rx_{+1}$. That is, an intermediate multiplication can define nodes of type $Nx_{+1}$ that can be reached from $N_0$ by performing X hops or traversals of a graph.

Additionally, note that, in some embodiments, every intermediate multiplication within a matrix-matrix multiplication must satisfy matrix multiplication rules (e.g., relating to matrix dimensions, and/or any other suitable rules). For example, in some embodiments, for a multiplication $R_x*Rx_{+1}$, a number of columns in matrix $R_x$ must equal a number of rows in matrix $Rx_{+1}$. In some embodiments, process 100 can store a dimension of each matrix representing a particular graph to ensure that matrix multiplications satisfy matrix multiplication rules.

At 106, process 100 can store any suitable matrices from an evaluation of a matrix-matrix multiplication expression. For example, in an instance where a matrix multiplication $M=R_0*R_1* \ldots *R_i$, process 100 can store the final multiplication result M, as well as any suitable intermediate matrices, such as $R_0*R_1$, $R_{i-1}*R_i$, and/or any other suitable intermedia matrix products. In some embodiments, process 100 can identify intermediate matrix products to be stored based on any suitable information. For example, in some embodiments, process 100 can identify intermediate matrix products to be stored based on a particular result requested in the query received at 102, as described below in more detail in connection with 108.

At 108, process 100 can determine a result corresponding to the query received at 102 based on the matrix multiplication performed at 106 and/or any intermediate matrix multiplication products, as described above in connection with 106. In some embodiments, process 100 can identify nodes along a traversed path that are to be considered based on a return clause specified within the query received at 102. For example, continuing with the query example described above in connection with 102 (e.g., "MATCH (p: Person)-[:friend]→(f:Person) RETURN p"), process 100 can identify node p as a node that is to be returned in response to the query. Note that, in this example, for a corresponding matrix of $M=R_1$, where rows of $R_1$ correspond to Person p nodes and columns of $R_1$ correspond to Person f nodes, matrix M contains all of the information required to return a result specified by the query. That is, matrix M specifies origin nodes (e.g., Person p) by the rows of matrix M, and sink nodes (e.g., Person f) by the columns of matrix M. Therefore, in this instance, a return result can be obtained by process 100 directly from matrix M.

Additionally or alternatively, in an example of a query that indicates multiple traversals and/or with a return clause that indicates nodes that are reached from intermediate traversals, process 100 can determine results corresponding to the query received at 102 using intermediate matrix products. For example, with an example query such as: "MATCH (p: Person)-[:friend]→(f:Person)-[:visit]→(c: Country)-[:peace]-(v:Country) RETURN c, v," the result clause "RETURN c, v" specifies that a sink node v is to be returned, and, additionally, an intermediate node c is to be returned. That is, process 100 can identify a result v from a matrix multiplication $R=R_0*R_1* \ldots *R_i$, and can identify a result c from an intermediate matrix product, as described below.

In some embodiments, process 100 can represent the above query as a matrix multiplication M=F*V*P. In some embodiments, F can be a matrix representing friendship edges, where rows and columns of matrix F both correspond to person nodes (e.g., persons that are connected by a friendship edge). In some embodiments, V can be a matrix representing visit edges, where rows of matrix V represents person nodes, and columns of matrix V represents countries visited (e.g., persons that have visited particular countries). In some embodiments, matrix P can be a matrix representing peace relationships between countries, where rows and columns of matrix P both correspond to country nodes (e.g., countries that are at peace with each other). Therefore, matrix M can represent a matrix that connects origin person nodes (e.g., rows of matrix M) to sink country nodes (e.g., columns of matrix M). However, because the query result indicates that countries that have been visited are to be returned, and because matrix M does not directly indicate countries that have been visited, matrix M cannot be directly used to identify all of the requested results indicated in the query.

In some embodiments, process 100 can identify nodes specified in the result clause that are neither origin nodes nor sink nodes corresponding to the query (i.e., a node that is not represented in matrix M) by identifying an intermediate matrix (e.g., an R matrix from the expression $M=R_1*R_2* \ldots *R_i$) that corresponds to a node specified by the result clause. In some embodiments, process 100 can then compute an intermediate matrix product that can be used to identify nodes specified in the result clause. For example, in the example query presented above, "MATCH (p: Person)-[:friend]→(f:Person)-[:visit]→(c:Country)-[:peace]-(v: Country) RETURN c, v," process 100 can construct an intermediate matrix X, which can equal F*V. In this case, intermediate matrix X can have columns that represent countries visited by friends. Process 100 can then construct a transitional matrix T, such that if column k of matrix X contains at least 1, T[k,k]=1. That is, matrix T can be a diagonal matrix. In some embodiments, process 100 can then multiply transitional matrix T by matrix P. In some embodiments, rows of matrix T*P can indicate countries visited, and columns T*P can indicate countries which are at peace with each other than have been visited by friends. In some embodiments, matrix T*P can then be used to identify the nodes c and v indicated in the result clause of the query.

In some embodiments, in an instance where the query is: "MATCH (p: Person)-[:friend]→(f:Person)-[:visit]→(c: Country)-[:peace]-(v:Country) RETURN p, c, v," process 100 can use a backtracking or reverse traversal to identify nodes p, c, and v. For example, continuing with this example, process 100 can construct a first intermediate matrix p→c=[0, 0, 1; 1, 0, 0; 0, 0, 0] and a second intermediate matrix c→v=[0, 0, 1; 0, 0, 0; 0, 1, 0]. In some embodiments, the first intermediate matrix p→c can indicate connections between origin nodes p to countries visited by friends, and the second intermediate matrix c→v can indicate connections between visited countries and other countries the visited countries are at peace with. In some embodiments, process 100 can begin by analyzing second intermediate matrix c→v to identify columns that are 1, indicating countries that have been visited in the rows dimension and countries the visited country is at peace with in the columns dimension. In the example of second intermediate matrix c→v, process 100 can therefore identify elements [1, 3] and [3, 2]. Beginning with element [1, 3], process 100 can then traverse backwards, and can scan the first column of first intermediate matrix p→c (that is, corresponding to the row of element [1, 3]) to identify elements in first intermediate matrix p→c that are 1 within the first column. Process 100 can then identify element [2, 1] of first intermediate matrix p→c. Therefore, process 100 can identify a first result set of p=2, c=1, and v=3. Note that, in some embodiments, intermediate matrices p→c and c→v can be generated using any suitable technique(s), such as by using one or more transition matrices, as described above.

In some embodiments, process 100 can then loop back and perform a similar analysis for the second identified element of second intermediate matrix c→v, [3, 2]. In particular, process 100 can scan the third column of first intermediate matrix p→c (that is, corresponding to the row element of element [3, 2]) to identify elements in first intermediate matrix p→c that are 1 within the third column of first intermediate matrix p→c. Process 100 can then identify element [1, 3] of first intermediate matrix p→c. Therefore, process 100 can identify a second result set of p=1, c=3, and v=2. In some embodiments, a full result set can be: {p=2, c=1, and v=3; p=1, c=3, and v=2}. That is, in some embodiments, a full result set can include all nodes corresponding to the elements originally identified in second intermediate matrix c→v, elements [1, 3] and [3, 2].

At 110, process 100 can identify and return a result corresponding to the results clause indicated in the query received at 102. For example, in the example described above in which the results clause indicated that country c and visited node v are to be returned, process 100 can identify a country c that corresponds to the values identified at block 108. As a more particular example, as described above at block 108, a full result set includes country values of c=1 and c=3. In some embodiments, process 100 can identify names of countries corresponding to the values c=1 and c=3, for example, "United States," "Mexico," "Canada," and/or any other suitable countries. In some embodiments, process 100 can then loop through and identify specific information associated with each identified node value. In some embodiments, process 100 can return the result(s) in any suitable manner, for example, in a user interface that was used to submit the query at 102.

Figure 2:
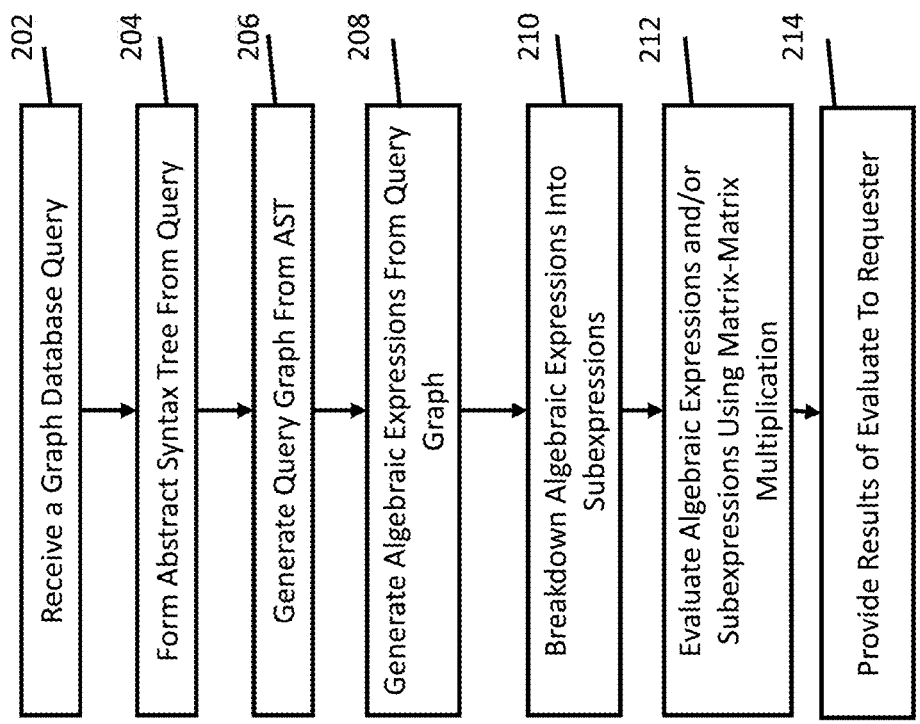
FIG. 2 shows another example of a process for resolving graph database queries in accordance with some embodiments of the disclosed subject matter.

Turning to FIG. 2, another example 200 of a process for resolving graph database queries that can be used in accordance with some embodiments of the disclosed subject matter is shown. Note that, in some embodiments, blocks of process 200 can be performed on any suitable device. For example, in some embodiments, a graph database can be stored on a user device, such as a desktop computer or a laptop computer, and blocks of process 200 can be executed by the user device. As another example, in some embodiments, a graph database can be stored on a server, and blocks of process 200 can be executed by the server.

Process 200 can begin at 202 by receiving a query related to a graph database. Any suitable query can be received in any suitable manner and have any suitable content. An example of a query relating to a graph that indicates relationships between different people can be: "MATCH (p:Person)-[:friend]→(f:Person) RETURN p." In this example, the query can indicate that nodes labeled as "Person" are to be returned, and, additionally, that each returned Person node must be connected with an edge that indicates a "Friend" relationship to another person. Note that, in some embodiments, a received query can request any suitable number of returned nodes. Additionally, in some embodiments, a received query can specify any suitable number (e.g., one, two, five, ten, and/or any other suitable number) of connections or edges between nodes. For example, the query described in the above example describes a relationship between two Person nodes connected by one Friend edge. As another example, a query can describe a relationship between any suitable number of person nodes (e.g., two, three, five, and/or any other suitable number) connected by any suitable edges (e.g., friendship, colleagues, classmates, and/or any other suitable edges or types of connections). Examples of queries that include more nodes and more edges than the above example are given above.

Note that, in some embodiments, the clause "RETURN p" as included in the example query shown above can be referred to as a "result clause" and/or as a "return clause." For example, in some embodiments, "RETURN p" can be referred to as a "return clause" in particular database query languages.

Next, at 204, process 200 can form an abstract syntax tree (AST) from the query. This AST can be formed in any suitable manner and can have any suitable content in some embodiments.

Then at 206, process 200 can create a query graph from the AST. This query graph can be formed in any suitable manner and can have any suitable content in some embodiments. For example, in some embodiments, the query graph can include a graph object G={V, E} representing the graph formed by the query search patterns. In this graph object, V can define the set of nodes to be searched by the query, and E can define the set of edges to be searched by the query. In some embodiments, the query graph can use adjacency-lists.

For example, consider the following query which specifies multiple search patterns:
MATCH (A)-[X]→(B)
MATCH (B)-[Y]→(C)←[Z]-( ), (D) RETURN C,D
The query search patterns can be represented by a graph as follows:
G={V, E}
V={A, B, C, D, anon0}
E={AXB, BYC, anon0ZC}

At 208, process 200 can next generate algebraic expression from the query graph. The algebraic expression can be formed in any suitable manner and can have any suitable content in some embodiments. For example, in some embodiments, an algebraic expression can be a list of operands, where each operand is a matrix (e.g., exp=[A, B, C]). In some embodiments, in addition to the list of operands, an expression can holds pointers to both the source node representing the expression row domain and a pointer to the destination node representing the expression column domain. For example, in some embodiments, an expression can have the following format:
Exp={src, dest, [operands]}

Figure 3:
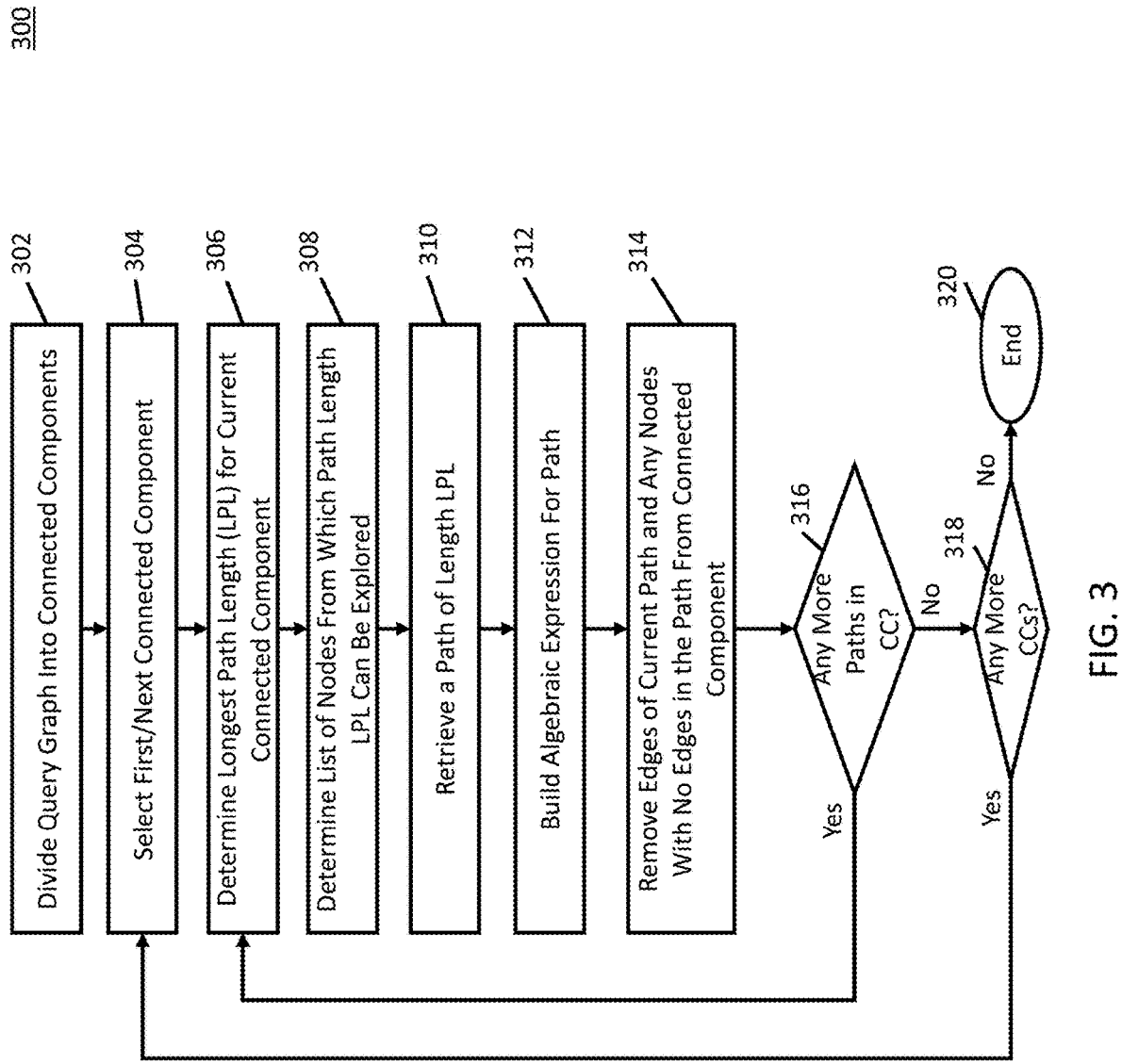
FIG. 3 shows an example of a process for generating algebraic expressions from query graphs in accordance with some embodiments of the disclosed subject matter.

Turning to FIG. 3, in accordance with some embodiments, a process 300 that can be used to generate algebraic expression from the query graph at 208 of FIG. 2 is shown. As illustrated, process 300 begins at 302 by dividing the query graph into its connected components (CC). A connected component of the query graph can be any suitable portion of the graph. For example, in some embodiments, each connected component can be a disjoint search pattern that will later be joined by a cartesian product operation. More particularly, for example, consider the following query:
MATCH (A)-[E]→(B), (C)-[X]→(D)
The query graph for this query can be:
G={V, E}
V={A,B,C,D}
E={AEB, CXD}
There are two connected components for this query graph:
CC0=V{A,B}, E={AEB}
CC1=V{C,D}, E={CXD}

Next, at 304, can select the first/next connected component. This selection can be made in any suitable manner. For example, in some embodiments, this selection can be based on the size of the connected component, such that larger connected components are selected first.

Then, at 306, for the selected connected component, process 300 can determine the length of the longest path (LPL) within that connected component. A path can be defined as a list of edges in some embodiments. The LPL is the longest path in terms of the number of edges traversed without revisiting a node—thus, a path does not include a cycle (e.g., [AD, DA], [AB, BC, CA]). Note there can be multiple different paths of length LPL in some embodiments.

Figure 6:
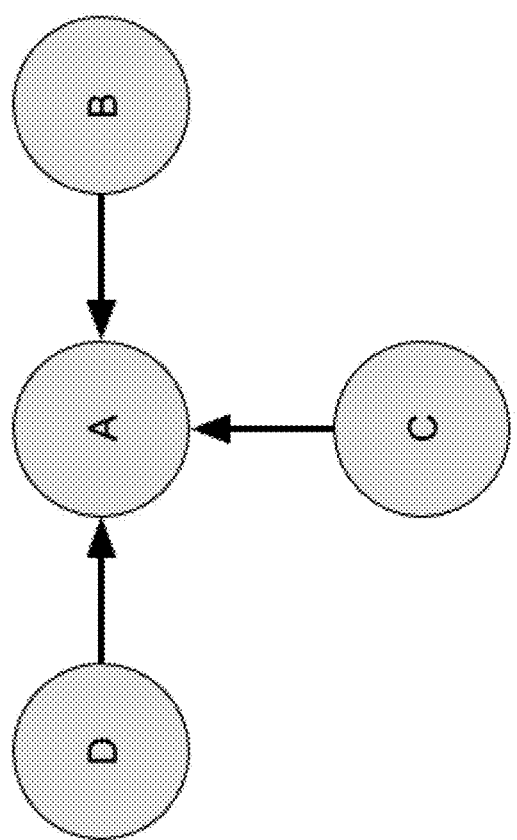
FIG. 6 is an example of an illustration of a graph in accordance with some embodiments of the disclosed subject matter.

For example, consider the graph of FIG. 6. As shown, the longest path length is two, and there are six different paths of length two: [[DA, AB], [DA, AC], [CA, AD], [CA, AB], [BA, AD], and [BA, AC]].

Note that edge direction is disregarded when computing LPL, as it is possible to traverse a graph in the reverse direction by transposing the matrix represented by the reversed edge.

Next, at 308, a list of nodes from which a path of length LPL can be explored is determined. For example, a list of nodes for LPL paths of the graph of FIG. 6 can be include nodes [D, B, C].

At 310, process 300 can next retrieve a path P of length LPL. Any suitable path can be retrieved. Continuing with the example graph of FIG. 6, the following path (or any other suitable path) can be retrieved in some embodiments: [DA, AB].

Figure 4:
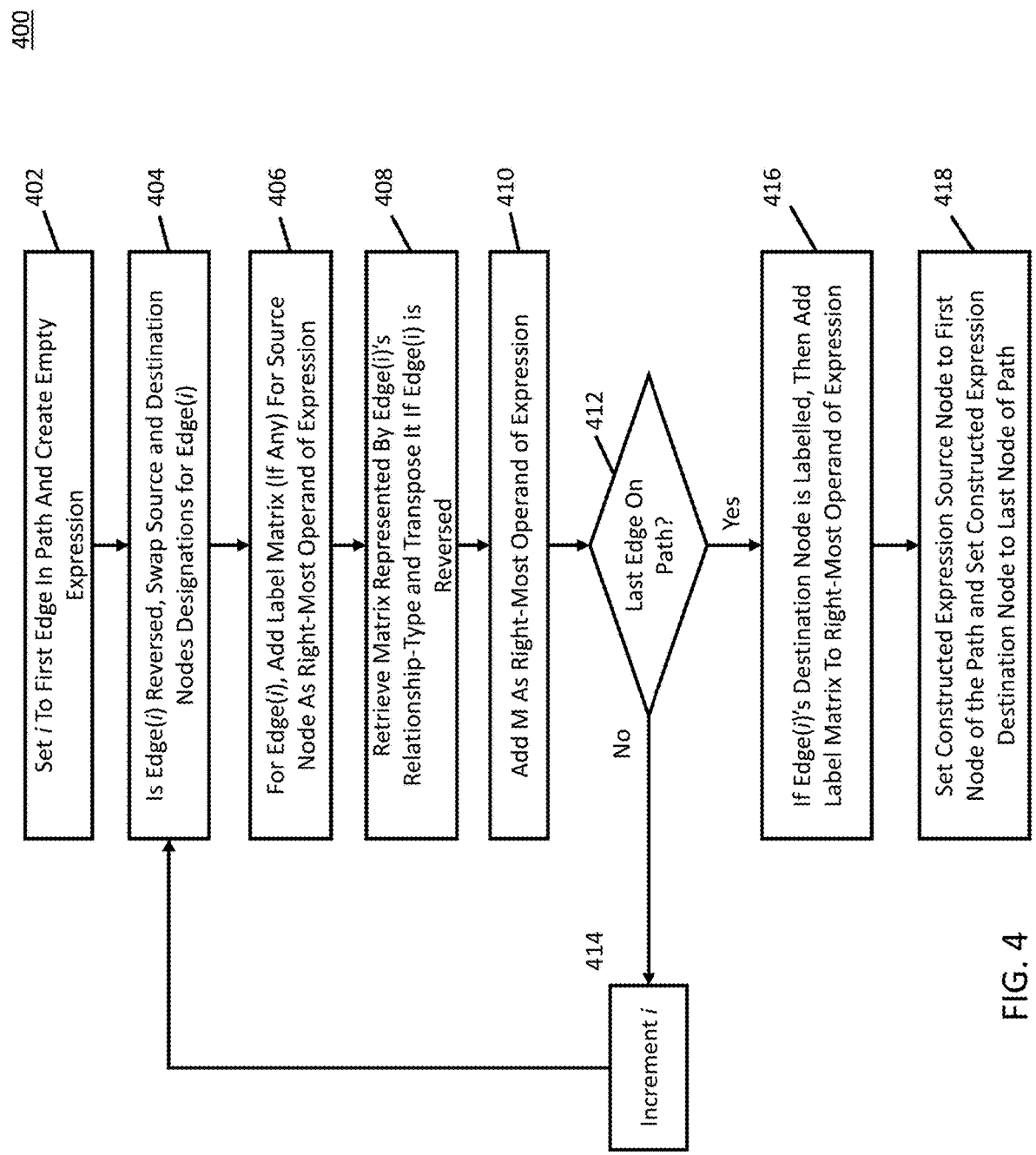
FIG. 4 shows an example of a process for generating an algebraic expression for a path of a graph in accordance with some embodiments of the disclosed subject matter.

Then, at 312, process 300 can build an algebraic expression for the path. This algebraic expression can be built in any suitable manner in some embodiments. For example, turning to FIG. 4, an algebraic expression can be built using process 400.

As shown, process 400 can begin at 402 by setting i to the first edge in the path and creating an empty expression.

Next, at 404, process 400 can determine if the current edge is reversed. This determination can be made in any suitable manner. For example, process can determine with the source node of the current edge is the same as the destination node of the previous edge (if any). If there is a previous edge, and the source node of the current edge is not the same as the destination node of the previous edge, then the current edge can be determined to be reversed, the source node can be determined to be the second node in the edge (rather than the first), and the destination node can be determined to be the first node in the edge (rather than the second).

Then, at 406, for the current edge E(i), process 400 can determine if E's source node is labeled, and, if so, get the label matrix represented by E's source node and add it as the right-most operand of the expression.

At 408, process 400 next can retrieve the matrix M represented by E(i)'s relationship type and transpose it if E(i) is reversed.

Next at 410, process 400 can add M (i.e., transposed M if M was transposed at 408) as the right-most operand of the expression.

Then, at 412, process 400 can determine if i equals N (last edge on path). If not, then process 400 can branch to 414 to increment i and then loop back to 404.

Otherwise, process 400 can determine at 416 if E(i)'s destination node is labeled, and, if so, get the label matrix represented by E(i)'s destination node and add it as the right-most operand of the expression.

Finally, at 418, process 400 can set the constructed expression source node to the first node of path and set the constructed expression destination node to the last node of path.

Consider the following example path: P=[DA, CA]. Starting at node D, hopping to A via edge DA, then going from A to C via the reversed edge CA.

Beginning at 402, process 400 can set i to edge DA and create empty algebraic expression: exp={ }.

Next, at 404, process 400 can determine that edge DA is not reversed.

Then, at 406, process 400 can determine that the source node D of edge DA is labelled as Ld and add the matrix Ld to the expression: exp={Ld}.

At 408, process 400 can retrieve matrix DA and determine that the current edge is not reversed and, therefore, that matrix DA does not need to be transposed.

Next, at 410, process 400 can add matrix DA to the expression: exp={Ld*DA}.

Then, process 400 can determine that the current edge is not the last edge of the path at 412, increment i at 414, and loop back to 404.

Upon return back to 404, process 400 can determine that edge CA is reversed because the edge is not the first edge and the source node of edge CA does not match the destination node of edge DA. Accordingly, it can set the source node to A and the destination node to C.

Next, at 406, process 400 can determine that node A is not labelled and therefore not add any label matrix to the expression.

Then, at 408, process 400 can retrieve matrix CA and transpose matrix CA because it is reversed as determine at 404.

At 410, process 400 can next add the transposed matrix CA to the expression: exp={Ld*DA*Transpose(CA)}.

Next, at 412, process 400 can determine that edge CA is the last edge in the path and therefore branch to 416.

At 416, process 400 can determined edge CA's destination node (C) is labelled as Lc, and therefore add label matrix Lc to the expression: exp={Ld*DA*Transpose(CA)*Lc}.

Finally, at 418, process 400 can update the expression's source and destination nodes: exp={src=D dest=C operands=[Ld, DA, Transpose(CA), Lc]}.

Returning to FIG. 3, after process 400 completes, at 314, process 300 can remove the edges of path P from the current connected component. Any node in path P which has no edges (incoming or outgoing) as a result of removing the edges of path P from the current connected component can also be removed from the current connected component.

Looking at the example graph of FIG. 6, after removing the path [DA, CA], the graph becomes: G{V={A, B}E={BA}}. Both nodes D and C were removed as all of the edges connected to them have been processed. Node A remains as it still has an edge (BA).

After removing edges and nodes at 314, process 300 determine if there are any more paths in the current connected component. If so, process can loop back to 304 to process the next LPL path. Otherwise, process 300 can proceed to 318 to determine if there are any more connected components in the graph. If so, process 300 can loop back to 304 to select the next connected component. Otherwise, process 300 can end.

In some embodiments, it may be desirable to breakdown expressions formed above into subexpressions in order to make sure that intermediate entities (whether node or edges) are not lost due to matrix-matrix multiplication. A graph entity (i.e., a node or an edge) can be considered to be intermediate if it is referenced somewhere within a query. For example, consider the following query:

MATCH (A)-[X]→(I)-[Y]→(Z) RETURN I

If [X]*[Y] was computed, it would not be possible to retrieve I.

In some embodiment, to make sure that intermediates are not lost, algebraic expressions can be inspected for intermediates, and, if such exist, the expression can be broken down into subexpressions such that an intermediate will either be the source node or the destination node of an expression (row/column domain).

Return to FIG. 2, algebraic expressions can be broken down into subexpressions at 210 of process 200 in some embodiments. In some embodiments, block 210 can be omitted from process 200. Any suitable process can be used for breaking down algebraic expression into subexpressions in some embodiments. For example, in some embodiments, process 500 of FIG. 5 can be used to break down algebraic expressions into subexpressions.

Figure 5:
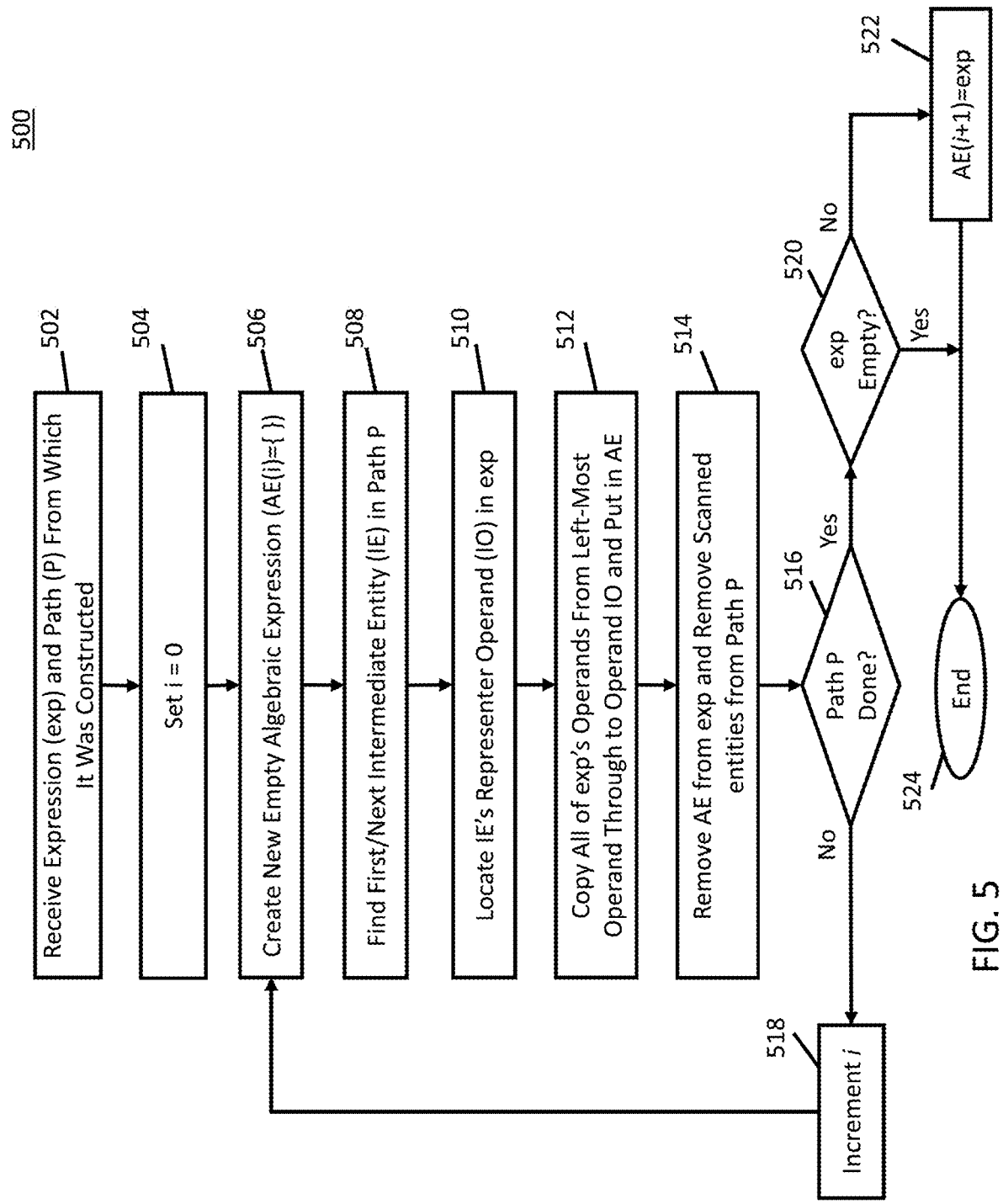
FIG. 5 shows an example of a process for breaking down algebraic expressions into subexpressions in accordance with some embodiments of the disclosed subject matter.

Turning to FIG. 5, process 500 can begin by receiving an expression (exp) and path P from which it was constructed at 502.

Next, at 504, process 500 can set a counter i to 0.

Then, at 506, process 500 can create a new empty algebraic expression AE(i)={ }.

At 508, process 500 can next find the first intermediate entity (IE) in path P. The IE can be either a node or an edge in some embodiments.

Next, at 510, process 500 can locate IE's representer operand (IO) in the original expression (exp). For example, IO can be a label matrix or a relation matrix corresponding to a node or an edge, respectively, in some embodiments.

Then, at 512, process 500 can copy all of operands of expression (exp) starting from the left-most operand all the way to operand IO and put them in AE(i).

At 514, process 500 can next remove AE(i) from expression (exp) and remove all scanned entities (nodes and edges) from path P.

Next, 518 can determine whether there are any remaining intermediate entities in path P (i.e., path P is not done). If path P is not done, then process 500 can increment i at 518 and loop back to 506 to process the next intermediate entity. Otherwise process can determine at 520 whether the expression (exp) is empty. If not, process can create a new algebraic expression AE(i+1) and set it equal to the expression (exp): AE(i+1)=exp.

For example, consider the example expression above [X]*[Y], X row/column domains (A,I) and Y row/column domains (I,Z). Recall that it is desirable to not lose I.

Process 500 can begin at 502 by receiving the expression [X]*[Y] and the path P ((A)-[X]→(I)-[Y]→(Z)) from which it was constructed.

Next, at 504, process 500 can set i to 0.

Then, at 506, process 500 can create a new empty algebraic expression: AE(0)={ }.

At 508, process 500 find the first intermediate entity (IE) in path P. In this case, the first intermediate entity is [X].

Next, at 510, process 500 can find the IE's representer operand (IO) in the expression (exp). In this case, the IO is [X].

Then, at 512, process 500 can add [X] to AE(0): AE(0)={X}.

At 514, process 500 can then remove AE(0) (which is equal to [X]) from expression (exp) and remove scanned entities from path P.

Next, at 516, process 500 can determine if there are any more intermediate entities (i.e., whether path P is done). In this example, since there are no more intermediate entities, process 500 branches to 520 at which it determines that the expression (exp) is not empty (it contains [Y]). Accordingly, at 522, process 500 sets AE(1)={Y}.

Process 500 then ends at 524.

Returning back to FIG. 2, after breaking down any expressions to subexpressions at 210, process 200 can evaluate the expressions and/or subexpressions at 212. The expressions and/or subexpressions can be evaluated in any suitable manner. For example, in some embodiments, any suitable hardware processor can perform matrix-matrix multiplication based on the contents of any suitable matrices identified in the expressions and/or subexpressions.

Finally, at 214, process 200 can identify and return a result corresponding to the results clause indicated in the query received at 202.

Figure 7:
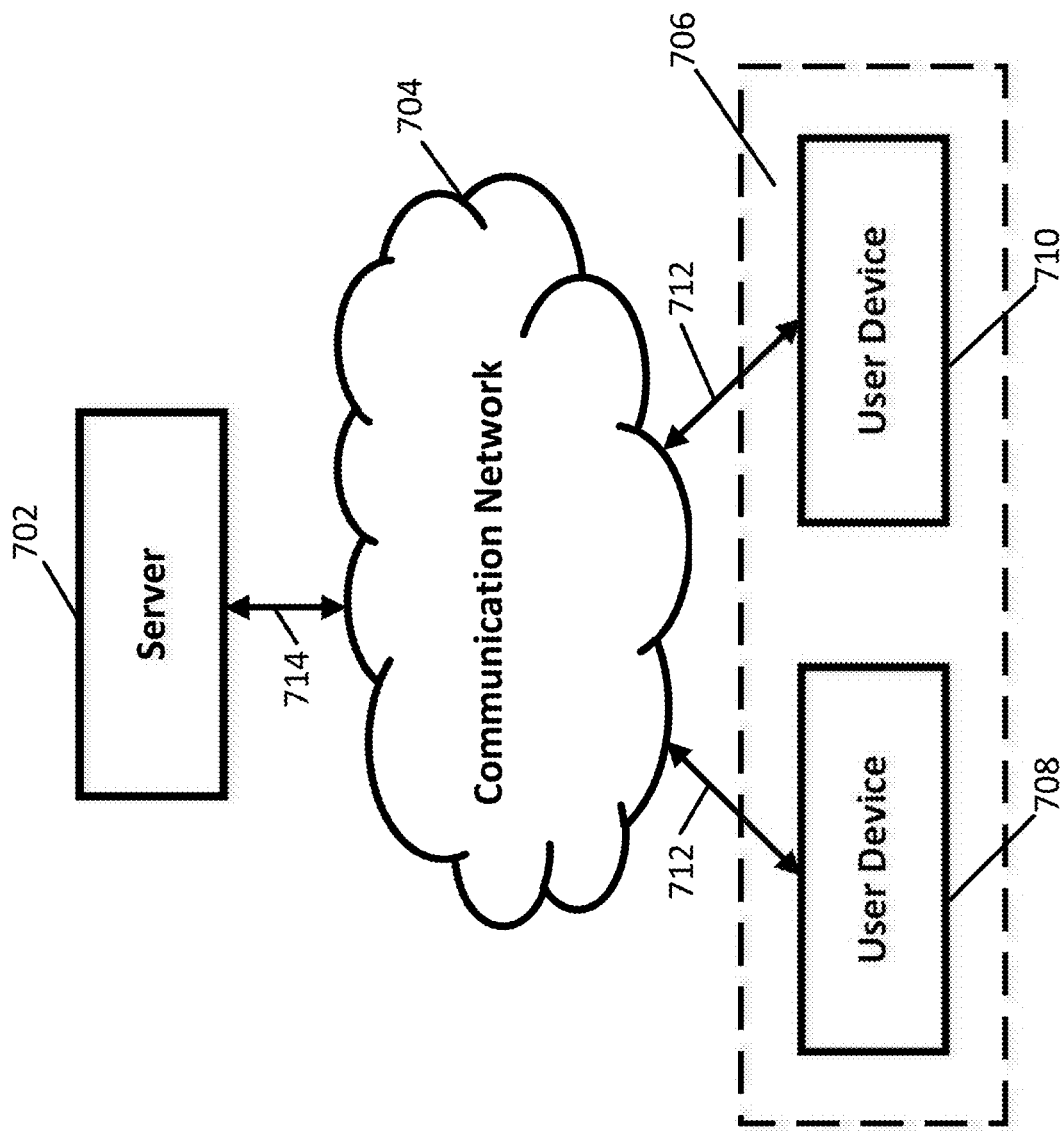
FIG. 7 shows a schematic diagram of an illustrative system suitable for implementation of mechanisms described herein for resolving graph database queries in accordance with some embodiments of the disclosed subject matter.

Turning to FIG. 7, an example 700 of hardware for resolving graph database queries that can be used in accordance with some embodiments of the disclosed subject matter is shown. As illustrated, hardware 700 can include a server 702, a communication network 704, and/or one or more user devices 706, such as user devices 708 and 710.

Server 702 can be any suitable server(s) for storing information, data, databases, and/or programs. For example, in some embodiments, server 702 can store a graph database that indicates relationships between nodes and edges on a graph. In some embodiments, server 702 can respond to queries related to a graph database, as described above in connection with FIGS. 1-6. In some embodiments, server 702 can be omitted.

Communication network 704 can be any suitable combination of one or more wired and/or wireless networks in some embodiments. For example, communication network 704 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 706 can be connected by one or more communications links (e.g., communications links 712) to communication network 704 that can be linked via one or more communications links (e.g., communications links 714) to server 702. The communications links can be any communications links suitable for communicating data among user devices 706 and server 702 such as network links, dial-up links, wireless links, hard-wired links, any other suitable communications links, or any suitable combination of such links.

User devices 706 can include any one or more user devices suitable for storing a graph database and/or transmitting queries to server 702 that stores a graph database. For example, in some embodiments, user devices 706 can include a mobile phone, a tablet computer, a desktop computer, a laptop computer, and/or any other suitable type of user device.

Although server 702 is illustrated as one device, the functions performed by server 702 can be performed using any suitable number of devices in some embodiments. For example, in some embodiments, multiple devices can be used to implement the functions performed by server 702.

Although two user devices 708 and 710 are shown in FIG. 7 to avoid over-complicating the figure, any suitable number of user devices, and/or any suitable types of user devices, can be used in some embodiments.

Figure 8:
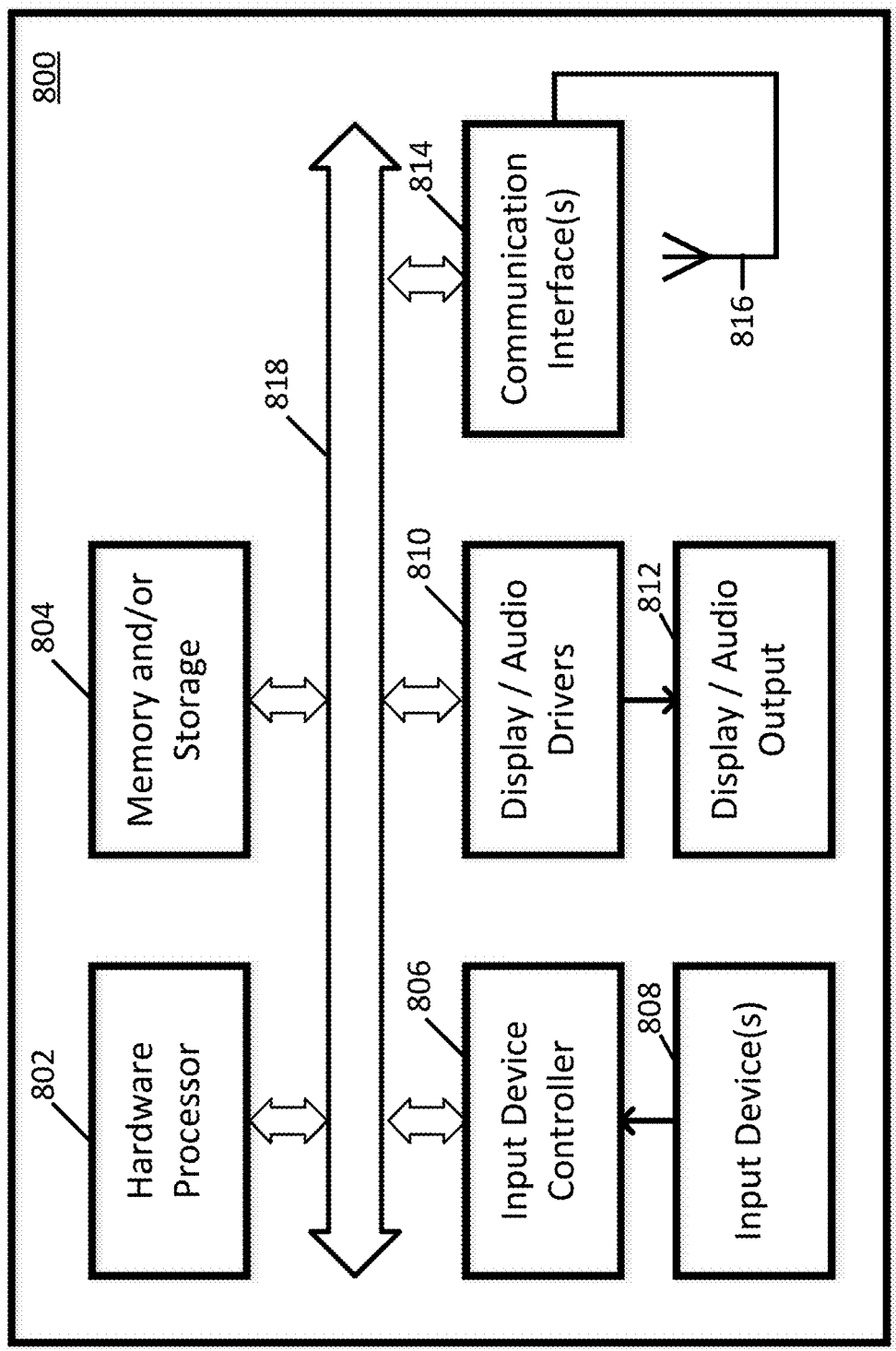
FIG. 8 shows a detailed example of hardware that can be used in a server and/or a user device of FIG. 7 in accordance with some embodiments of the disclosed subject matter.

Server 702 and user devices 706 can be implemented using any suitable hardware in some embodiments. For example, in some embodiments, devices 702 and 706 can be implemented using any suitable general-purpose computer or special purpose computer. For example, a mobile phone may be implemented using a special purpose computer. Any such general-purpose computer or special purpose computer can include any suitable hardware. For example, as illustrated in example hardware 800 of FIG. 8, such hardware can include hardware processor 802, memory and/or storage 804, an input device controller 806, an input device 808, display/audio drivers 810, display and audio output circuitry 812, communication interface(s) 814, an antenna 816, and a bus 818.

Hardware processor 802 can include any suitable hardware processor, such as a microprocessor, a micro-controller, digital signal processor(s), dedicated logic, and/or any other suitable circuitry for controlling the functioning of a general-purpose computer or a special purpose computer in some embodiments. In some embodiments, hardware processor 802 can be controlled by a server program stored in memory and/or storage of a server, such as server 702. For example, in some embodiments, the server program can cause hardware processor 802 to translate a received query related to a graph database to an expression, evaluate the expression, return information corresponding to the query, and/or perform any other suitable functions. In some embodiments, hardware processor 802 can be controlled by a computer program stored in memory and/or storage 804 of user device 706. For example, the computer program can cause hardware processor 802 to transmit a query relating to a graph database to a server storing the graph database, respond to a query relating to a graph database that is stored on user device 706 using the techniques described above in connection with FIGS. 1-6, and/or perform any other suitable functions.

Memory and/or storage 804 can be any suitable memory and/or storage for storing programs, data, and/or any other suitable information in some embodiments. For example, memory and/or storage 804 can include random access memory, read-only memory, flash memory, hard disk storage, optical media, and/or any other suitable memory.

Input device controller 806 can be any suitable circuitry for controlling and receiving input from one or more input devices 808 in some embodiments. For example, input device controller 806 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 810 can be any suitable circuitry for controlling and driving output to one or more display/audio output devices 812 in some embodiments. For example, display/audio drivers 810 can be circuitry for driving a touchscreen, a flat-panel display, a cathode ray tube display, a projector, a speaker or speakers, and/or any other suitable display and/or presentation devices.

Communication interface(s) 814 can be any suitable circuitry for interfacing with one or more communication networks (e.g., computer network 704). For example, interface(s) 814 can include network interface card circuitry, wireless communication circuitry, and/or any other suitable type of communication network circuitry.

Antenna 816 can be any suitable one or more antennas for wirelessly communicating with a communication network (e.g., communication network 704) in some embodiments. In some embodiments, antenna 816 can be omitted.

Bus 818 can be any suitable mechanism for communicating between two or more components 802, 804, 806, 810, and 814 in some embodiments.

Any other suitable components can be included in hardware 800 in accordance with some embodiments.

In some embodiments, at least some of the above described blocks of the processes of FIGS. 1-5 can be executed or performed in any order or sequence not limited to the order and sequence shown in and described in connection with the figure. Also, some of the above blocks of FIGS. 1-5 can be executed or performed substantially simultaneously where appropriate or in parallel to reduce latency and processing times. Additionally or alternatively, some of the above described blocks of the processes of FIGS. 1-5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although examples of queries that can be used in some embodiments are provided herein in the Cypher query language, any suitable query language can be used in some embodiments. For example, in some embodiments, any one or more of Graphql, Cypher, OpenCypher, Sparql, Gremlin, and/or any other suitable query language can be used.

Accordingly, methods, systems, and media for resolving graph database queries are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for resolving a database query comprising:
   identifying a connected component in a query graph corresponding to the database query;
   determining a longest path length for the connected component;
   selecting a path having the longest path length;
   building an algebraic expression for the path;
   solving the algebraic expression using matrix-matrix multiplication to provide a solution; and
   responding to the query based on the solution,
   wherein building the algebraic expression for the path comprises:
     creating an expression that is empty;
     for each edge on the path:
       if the source node is labelled, getting a label matrix represented by the source node and add the label matrix as a right-most operand of the expression;
       retrieving a representation type matrix represented by the source node; and
       adding the representation type matrix as a right-most operand of the expression;
     for a last edge on the path, if the destination node of the last edge is labelled, adding a label matrix of the destination node of the last edge to the right-most operand of the expression; and
     setting a source node of the expression to a first node of the path and a destination node of the expression to a last node of the path.

2. The method of claim 1, further comprising:
for each edge on the path when building the algebraic expression for the path, if the edge is reversed, swapping a designation of a source node for the edge and a designation of a destination node for the edge.

3. The method of claim 1, further comprising:
for each edge on the path when building the algebraic expression for the path, if the edge is reversed, transposing the representation type matrix.

4. The method of claim 1, further comprising dividing the query graph into a plurality of connected components which includes the connected component.

5. The method of claim 1, wherein the connected component is a disjoint search pattern.

6. The method of claim 1, wherein the connected component has a length greater than or equal to any other connected component in the query graph.

7. The method of claim 1, wherein the longest path length is a path length that is larger than any other path length for the query graph, and the path length is a count of consecutive edges traversed in the query graph without revisiting a node.

8. The method of claim 1, further comprising removing from the connected component: all edges of the path; and then any nodes in the path that have no remaining connected edges.

9. A system for resolving a database query comprising:
a memory;
at least one hardware processor coupled to the memory and collectively configured to:
identify a connected component in a query graph corresponding to the database query;
determine a longest path length for the connected component;
select a path having the longest path length;
build an algebraic expression for the path;
solve the algebraic expression using matrix-matrix multiplication to provide a solution; and
respond to the query based on the solution,
wherein building the algebraic expression for the path comprises:
creating an expression that is empty;
for each edge on the path:
if the source node is labelled, getting a label matrix represented by the source node and add the label matrix as a right-most operand of the expression;
retrieving a representation type matrix represented by the source node; and
adding the representation type matrix as a right-most operand of the expression;
for a last edge on the path, if the destination node of the last edge is labelled, adding a label matrix of the destination node of the last edge to the right-most operand of the expression; and
setting a source node of the expression to a first node of the path and a destination node of the expression to a last node of the path.

10. The system of claim 9, wherein the at least one hardware processor is also collectively configured to:
for each edge on the path when building the algebraic expression for the path, if the edge is reversed, swapping a designation of a source node for the edge and a designation of a destination node for the edge.

11. The system of claim 9, wherein the at least one hardware processor is also collectively configured to:
for each edge on the path when building the algebraic expression for the path, if the edge is reversed, transposing the representation type matrix.

12. The system of claim 9, wherein the at least one hardware processor is also collectively configured to divide the query graph into a plurality of connected components which includes the connected component.

13. The system of claim 9, wherein the connected component is a disjoint search pattern.

14. The system of claim 9, wherein the connected component has a length greater than or equal to any other connected component in the query graph.

15. The system of claim 9, wherein the longest path length is a path length that is larger than any other path length for the query graph, and the path length is a count of consecutive edges traversed in the query graph without revisiting a node.

16. The system of claim 9, wherein the at least one hardware processor is also collectively configured to remove from the connected component: all edges of the path; and then any nodes in the path that have no remaining connected edges.

17. A non-transitory computer-readable medium containing computer-executable instructions that, when executed by a processor, cause the processor to perform a method for resolving a database query, the method comprising:
identifying a connected component in a query graph corresponding to the database query;
determining a longest path length for the connected component;
selecting a path having the longest path length;
building an algebraic expression for the path;
solving the algebraic expression using matrix-matrix multiplication to provide a solution; and
responding to the query based on the solution,
wherein building the algebraic expression for the path comprises:
creating an expression that is empty;
for each edge on the path:
if the source node is labelled, getting a label matrix represented by the source node and add the label matrix as a right-most operand of the expression;
retrieving a representation type matrix represented by the source node; and
adding the representation type matrix as a right-most operand of the expression;
for a last edge on the path, if the destination node of the last edge is labelled, adding a label matrix of the destination node of the last edge to the right-most operand of the expression; and
setting a source node of the expression to a first node of the path and a destination node of the expression to a last node of the path.

18. The non-transitory computer-readable medium of claim 17, wherein the method further comprises:
for each edge on the path when building the algebraic expression for the path, if the edge is reversed, swapping a designation of a source node for the edge and a designation of a destination node for the edge.

19. The non-transitory computer-readable medium of claim 17, wherein the method further comprises:
for each edge on the path when building the algebraic expression for the path, if the edge is reversed, transposing the representation type matrix.

20. The non-transitory computer-readable medium of claim 17, wherein the method further comprises dividing the query graph into a plurality of connected components which includes the connected component.

21. The non-transitory computer-readable medium of claim 17, wherein the connected component is a disjoint search pattern.

22. The non-transitory computer-readable medium of claim 17, wherein the connected component has a length greater than or equal to any other connected component in the query graph.

23. The non-transitory computer-readable medium of claim 17, wherein the longest path length is a path length that is larger than any other path length for the query graph, and the path length is a count of consecutive edges traversed in the query graph without revisiting a node.

24. The non-transitory computer-readable medium of claim 17, wherein the method further comprises removing from the connected component: all edges of the path; and then any nodes in the path that have no remaining connected edges.

\* \* \* \* \*